(12) United States Patent
Klein

(10) Patent No.: US 7,419,207 B2
(45) Date of Patent: Sep. 2, 2008

(54) TONNEAU COVER FOR A TRUCK BOX

(75) Inventor: Peter Klein, Winnipeg (CA)

(73) Assignee: KBS Industries Inc., Winkler, Manitoba (CA)

( * ) Notice: Subject to any disclaimer, the term of this patent is extended or adjusted under 35 U.S.C. 154(b) by 0 days.

(21) Appl. No.: 11/442,652

(22) Filed: May 30, 2006

(65) Prior Publication Data

US 2007/0210608 A1  Sep. 13, 2007

Related U.S. Application Data

(60) Provisional application No. 60/780,067, filed on Mar. 8, 2006.

(51) Int. Cl.
*B60P 7/02* (2006.01)
(52) U.S. Cl. .............................. 296/100.06; 296/100.07
(58) Field of Classification Search ............ 296/100.06, 296/26.06, 32, 36, 37.6, 100.07
See application file for complete search history.

(56) References Cited

U.S. PATENT DOCUMENTS

| | | | | | |
|---|---|---|---|---|---|
| 2,856,225 | A | * | 10/1958 | Selzer ........................ | 296/13 |
| 3,069,199 | A | * | 12/1962 | Reardon et al. ......... | 296/100.07 |
| 3,737,190 | A | * | 6/1973 | Smith et al. .................. | 296/159 |
| 3,765,717 | A | * | 10/1973 | Garvert .................. | 296/100.07 |
| 3,768,858 | A | * | 10/1973 | Boismier ............... | 296/100.09 |
| 3,841,690 | A | * | 10/1974 | Piercy .......................... | 296/10 |
| 4,036,521 | A | * | 7/1977 | Clenet ................... | 296/100.15 |
| 4,284,303 | A | * | 8/1981 | Hather .................. | 296/100.17 |
| 4,302,044 | A | * | 11/1981 | Sims ........................ | 296/186.4 |
| 4,405,170 | A | * | 9/1983 | Raya .......................... | 296/10 |
| 4,531,775 | A | * | 7/1985 | Beals .................... | 296/100.06 |
| 5,009,457 | A | * | 4/1991 | Hall ............................ | 296/3 |
| 5,011,214 | A | * | 4/1991 | Friesen et al. .......... | 296/100.09 |
| 5,110,021 | A | * | 5/1992 | Dawson, Jr. ................. | 224/405 |
| 5,344,159 | A | * | 9/1994 | Powell .................. | 296/100.09 |
| 5,487,585 | A | * | 1/1996 | Wheatley ............... | 296/100.18 |
| 6,095,587 | A | * | 8/2000 | Shirlee et al. .......... | 296/100.07 |
| 6,224,140 | B1 | * | 5/2001 | Hoplock ................. | 296/100.17 |
| 6,254,169 | B1 | * | 7/2001 | Arthur .................... | 296/100.07 |
| 6,338,520 | B2 | * | 1/2002 | Rusu et al. ............. | 296/100.07 |
| 6,340,195 | B1 | * | 1/2002 | Hall et al. .............. | 296/100.07 |
| 6,598,930 | B1 | * | 7/2003 | Tilton .................... | 296/100.06 |
| 6,607,229 | B1 | * | 8/2003 | McIntosh ................. | 296/26.06 |
| 6,627,018 | B1 | * | 9/2003 | O'Neill et al. ................. | 156/78 |

(Continued)

*Primary Examiner*—Kiran B. Patel
(74) *Attorney, Agent, or Firm*—Adrian D. Battison; Michael R. Williams; Ryan W. Dupuis

(57) ABSTRACT

A tonneau cover is arranged to mount on the truck box of a conventional pick up truck for enclosing the box. The cover comprises a pair of panels which are pivotally mounted on respective sides of the box. The panels extend laterally inward such that free ends of the panels engage each other in a closed position. The panels may be pivoted upward and secured in an upward orientation by a pair of rails connected between the free ends of the respective panels in an extended position of the panels. The panels form a pair of side walls in the extended position for supporting large cargo in the box. The rails form a rack in the extended position for supporting additional cargo thereon. A locking device secures the panels in the closed position while a plurality of struts provides additional support to the panels when pivoting the panels between the closed and extended positions.

15 Claims, 14 Drawing Sheets

U.S. PATENT DOCUMENTS

| | | |
|---|---|---|
| 6,644,708 B1 * | 11/2003 | Grzegorzewski et al. ...... 296/32 |
| 6,663,160 B2 * | 12/2003 | Yarbrough et al. ..... 296/100.06 |
| 6,783,169 B1 * | 8/2004 | Marx et al. ............ 296/100.09 |
| 6,799,784 B2 * | 10/2004 | Rios ........................ 296/26.06 |
| 6,902,222 B2 * | 6/2005 | Nykiel et al. .......... 296/100.02 |
| 6,929,303 B1 * | 8/2005 | Sharples .................... 296/37.6 |
| 7,056,567 B2 * | 6/2006 | O'Neill et al. ................ 428/71 |
| 7,163,253 B2 * | 1/2007 | Montagna et al. ...... 296/100.02 |
| 7,234,763 B2 * | 6/2007 | Gupta et al. ................. 296/208 |
| 7,243,965 B2 * | 7/2007 | King et al. ............... 296/26.07 |
| 7,246,839 B1 * | 7/2007 | Nyberg .................. 296/100.06 |
| 7,252,322 B2 * | 8/2007 | Rusu ...................... 296/100.07 |
| 2005/0140177 A1 * | 6/2005 | Montagna et al. ........... 296/191 |
| 2007/0035151 A1 * | 2/2007 | Rusu ...................... 296/100.01 |
| 2007/0126257 A1 * | 6/2007 | Montagna et al. ...... 296/100.02 |
| 2007/0210608 A1 * | 9/2007 | Klein .................... 296/100.02 |

* cited by examiner

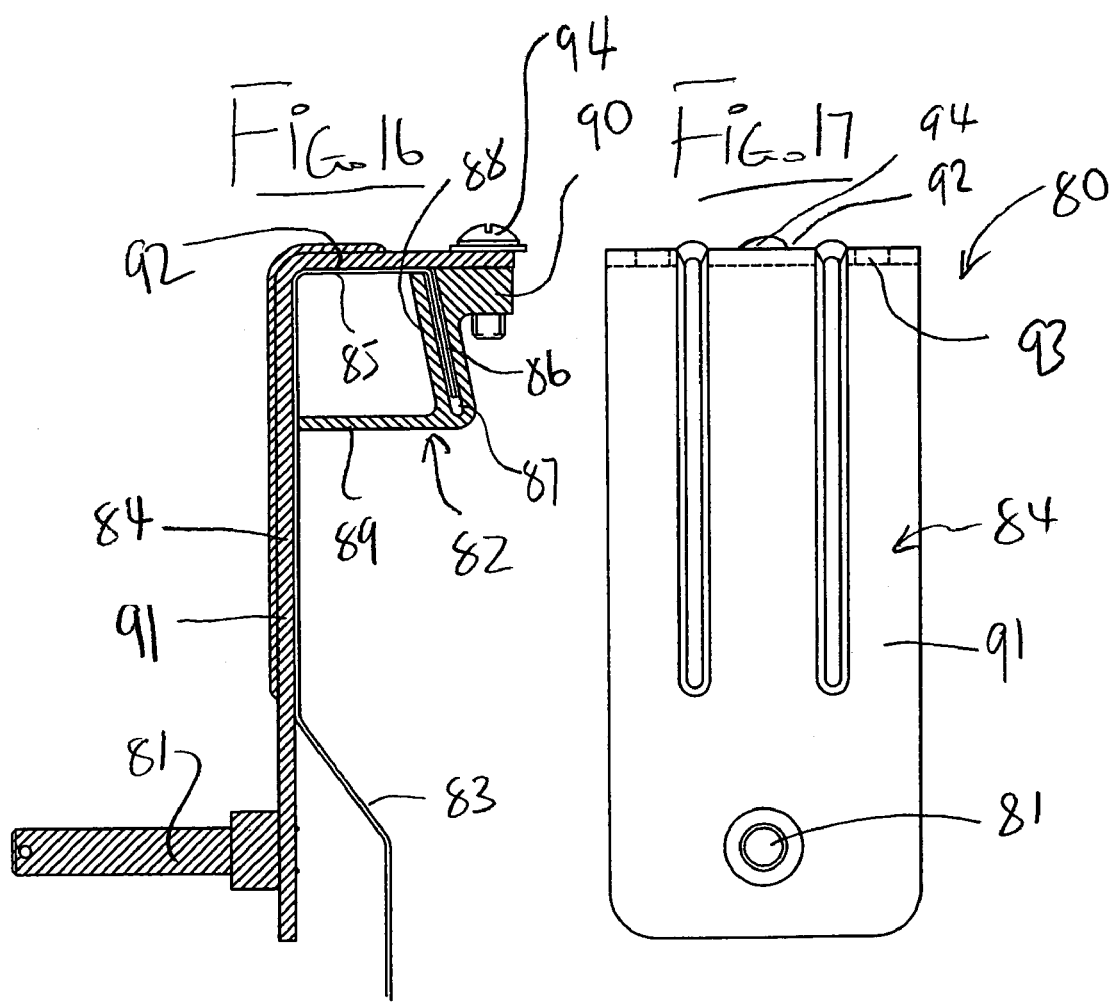

TONNEAU COVER FOR A TRUCK BOX

This application claims the benefit of priority under 35 U.S.C. 110 from Provisional Application No: 60/780,067 filed Mar. 8 2006.

FIELD OF THE INVENTION

This invention relates to a tonneau cover for use with conventional pick up trucks having a truck box.

BACKGROUND OF THE INVENTION

Conventional pick up trucks generally have a truck box on a rearward end for carrying cargo. The use of a tonneau cover which is secured to the truck box is common for enclosing the truck box and for preventing theft of the cargo while the vehicle is unattended.

In U.S. Pat. No. 5,110,021 (Dawson) issued May 5, 1992 is disclosed a tonneau cover which includes two separate panels each of which is hinged to a respective side wall of the truck box. Each panel can pivot from a raised position in which it stands generally upwardly from the side wall to a closed position in which it lies generally horizontally across the truck box so that the two panels in the middle and close the open top of the truck box. A pair of rails are provided each mounted on a respective one of the panels and each extending from that panel to the other panel. The rails are spaced so that one is toward the front and one is toward the rear to hold the panels in the raised position and to act as a support for a load over the truck box. This arrangement has achieved no commercial success and the construction shown in the patent is of a simple and schematic nature with little attention to the important details of the mounting of the construction on the truck. box.

U.S. Pat. No. 6,224,140 (Hoplock) issued May 1, 2001 discloses a further device of the same general type which gives further details concerning constructions of the device and how it is attached to the side walls of the truck box. Again however this device has achieved no commercial success requiring a significant redesign of the construction.

In U.S. Pat. No. 6,340,915 (Hall) issued Jan. 22, 2002 is disclosed an arrangement of this general type and in particular shows a locking arrangement for locking the edge of one panel to the next adjacent panel to hold the panels in closed position.

In U.S. Pat. No. 6,254,169 (Arthur) issued Jul. 3, 2001 is disclosed a hinging arrangement for attachment of the panels to the top wall of the truck box.

In U.S. Pat. No. 6,598,930 (Tilton) issued Jul. 29, 2003 is disclosed a further arrangement of this type which includes a locking arrangement for locking the edge of one panel relative to the other.

In U.S. Pat. No. 6,799,784 (Rios) issued Oct. 5, 2004 is disclosed an arrangement of this type which is particularly concerned with the mounting of the transverse rails to the underside of the panels.

None of the above devices has achieved commercial success and it is believed that this is primarily due to failure of the products to apply sufficient attention to the construction and details of the mounting arrangement and the formation of the panels by which the panels can be properly mounted and provide a proper stable structural arrangement which can be carried on the truck box and held in position without deformation or twisting.

SUMMARY OF THE INVENTION

It is one object of the present invention to provide an improved tonneau cover.

According to a first aspect of the present invention there is provided a tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:

a pair of mounting rails each arranged to be mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting rail such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall, each mounting rail having a row of fasteners adjacent an inner edge for engagement into a corresponding row of first holes in the side wall;

each mounting rail having a second row of fasteners, spaced outwardly of the first row, for engagement into a corresponding row of second holes in the side wall.

Preferably the fasteners of the first row are fastened from inside the box.

Preferably the fasteners of the first row include bolts which have a head captured underneath a top surface of the mounting rail so as to be hidden.

Preferably the fasteners of the second row are fastened from on top of the mounting rail.

Preferably the fasteners of the second row include butterfly clips on the underside of the side wall.

According to a second aspect of the present invention there is provided a tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:

a pair of mounting rails each arranged to be mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting rail such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall and an inner portion for depending along an inner surface of the respective side wall;

each panel having an outer down-turned lip arranged adjacent the inner portion of the respective mounting rail;

each mounting rail including a hinge arranged between the outer edge of a respective panel and the inner portion of the respective mounting rail, the hinge comprising two longitudinal connecting members each fastened along a respective one of the outer edge and the inner portion and a continuous flex coupling therebetween such that the hinge acts as a seal between the outer edge and the inner portion.

Preferably the hinge extends continuously along the respective panel.

Preferably each connecting member includes a top lip and a depending wall with the continuous flex coupling forming a flexible portion connected across the connecting members at the top lip.

Preferably each connecting member has a guide flange portion extending therefrom toward the other connecting member.

According to a third aspect of the present invention there is provided a tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:

a pair of mounting rails each arranged to be mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting rail such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall, wherein each panel is molded from an inner layer and an outer layer each formed from a plastics material with the outer layer having a panel portion and a surrounding depending lip and with the inner layer being bonded inside the outer layer;

the inner layer being shaped to define a plurality of ribs which extend in a direction transverse to the truck box.

Preferably the ribs are recessed to receive the frame element when stored in a retracted position extending longitudinally along the respective panel.

Preferably there are provided three recesses in the ribs at positions spaced longitudinally of the panel, where a first recess is arranged to receive an end of the frame element attached to the panel, a second recess is arranged to receive an opposed end of the frame element and a third recess is arranged to receive and end of the frame element of the opposite panel.

Preferably inner layer forms a shelf around the outer edge of the panel with a shelf lip of the inner layer at the outer lip of the outer layer to support the shelf for engaging onto a top surface of the truck box.

Preferably the shelf at the front and rear ends of the panel is shaped such that a spacing of the shelf from the outer layer increases toward a center of the truck box such that the resting of the shelf on the edge of the truck box acts to hold the panels raised at the center of the truck box and lowered at the side walls of the truck box.

Preferably each frame element includes a base plate for mounting the frame element on the respective panel wherein the base plate is trapped between the inner and outer layers.

Preferably the layers are formed from ABS.

According to a fourth aspect of the present invention there is provided a tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:

a pair of mounting rails each arranged to be mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting rail such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall;

one of the panels having a raised rib along the inner edge for engaging into a recess along the inner edge of the other panel;

one of the panels having a plurality of locking toggle members mounted thereon for pivotal movement to engage underneath a bottom edge of the other panel;

the toggle members being pivotal by a longitudinal bar extending along the panel.

Preferably the locking toggle members are mounted on one of the panels which includes a down-turned lip along its edge at the other panel and wherein the other panel includes a channel along its outer edge with the locking toggle members being arranged to engage underneath a bottom wall of the channel.

According to a fifth aspect of the present invention there is provided a tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:

a pair of mounting rails each arranged to be mounted on a top surface of a respective side wall of the truck box;

a pair of panels each pivotally mounted on a respective one of the mounting rails for pivotal movement between a closed position and a raised open position;

each panel in the closed position extending inward from the corresponding mounting rail to a free end such that the free ends of the panels engage each other in the closed position of the panels;

each panel in the raised open position extending generally upward from the corresponding mounting rail such that the free ends are spaced apart;

two frame elements each mounted between the panels in the raised open position such that the panels are supported in an upright orientation for containing cargo in the truck box, the frame elements being mounted adjacent respective forward and rearward ends of the panels;

each mounting rail including a horizontal portion lying on the top surface of the respective side wall;

each panel having a spring member for assisting in supporting the weight of the panel as it is raised;

and a bracket for mounting on the truck box at a front wall of the truck box, the front wall of the truck box having an upstanding inner wall, a horizontal top surface and an outer depending flange;

wherein the bracket comprises:

a first member having a slot for engaging upwardly onto the depending flange;

and a second plate member;

the second plate member having a top plate arranged to extend over the top surface of the front wall of the truck box for the top plate to be bolted onto the first member the second plate member having a second depending plate attached to the first plate and depending therefrom along the inner wall of the truck box, the depending plate having attached thereto a connector for receiving an end of the spring member.

Preferably the first member has a wall extending from the depending flange to the inner wall of the truck box and a bolt receptacle at the top surface for receiving a bolt extending downwardly from the top plate of the second plate member.

BRIEF DESCRIPTION OF THE DRAWINGS

In the accompanying drawings, which illustrate an exemplary embodiment of the present invention:

FIG. 16 is a cross sectional view through the front end wall of the truck box showing a bracket for attachment of the lower end of the gas spring for assisting lifting of the panel relative to the truck box.

FIG. 17 is a front elevational view of the bracket of FIG. 16.

DETAILED DESCRIPTION

Figure 1:
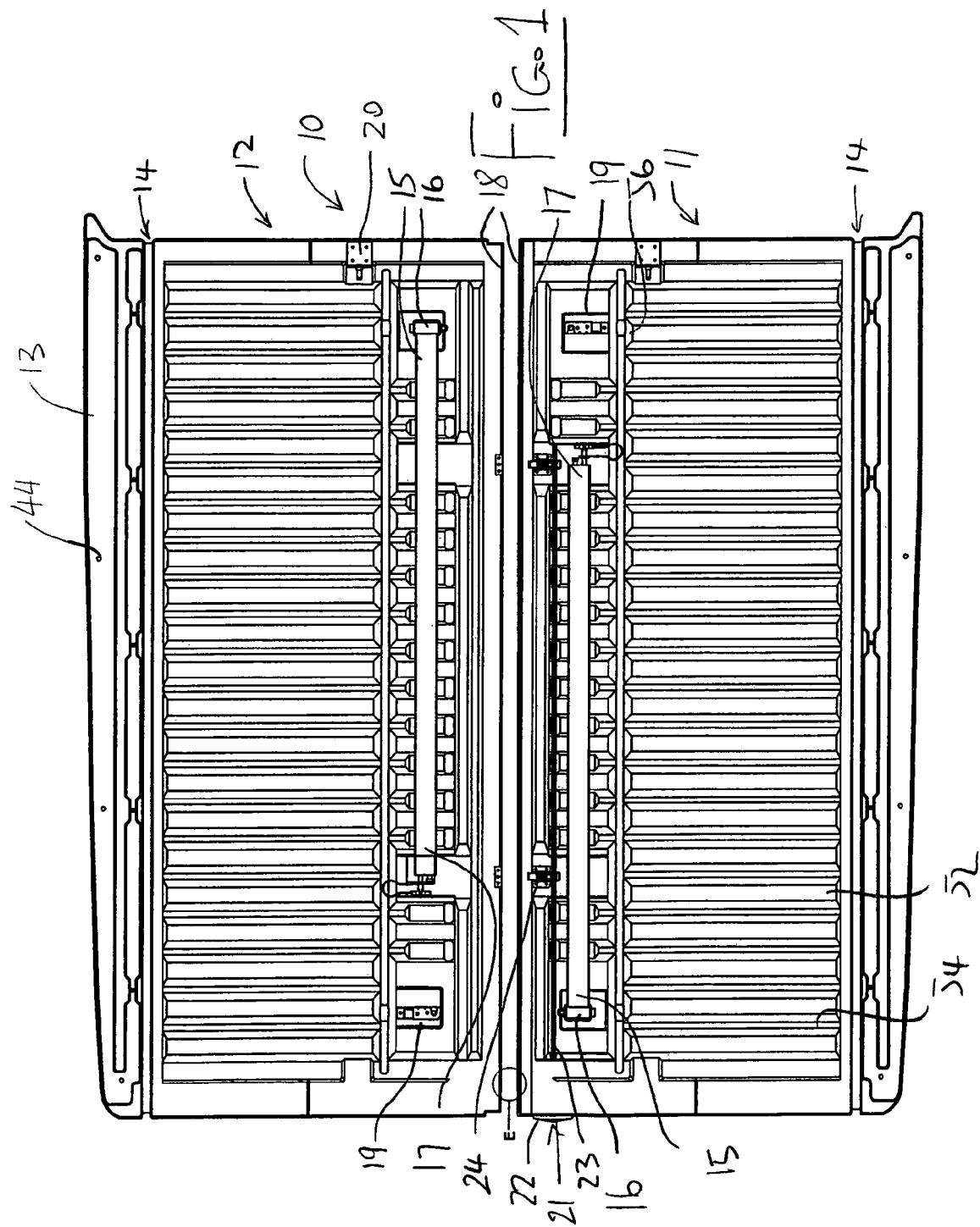
FIG. 1 is a bottom plan view of the two panels and the side rails for mounting the panels on the truck box according to a first embodiment of the present invention.

In FIG. 1 is shown a tonneau cover generally indicated at 10 which includes a first panel 11 and a second panel 12 which can be placed over a truck box so that the panel 12 is on the drivers side and forms the left hand panel when viewed from the rear and the panel 11 is on the passenger side and forms the right hand panel when viewed from the rear. The view as shown in FIG. 1 has the panels inverted to show the underside.

The truck box is of course not shown since this is well known to any person skilled in this art so that the truck box includes a front wall and two side walls together with a rear tail gate which is hinged at the bottom so that it can be folded downwardly to allow access into the truck box. The side walls of the truck box have a horizontal top surface which separates an inner wall of the truck box from the outer wall of the vehicle. Similarly the truck box has a front wall with a top surface with a front depending flange so that the top surface connects to the inside wall of the truck box at the front.

The panels are of a general arrangement which is known from the above prior art and each panel includes a side rail 13 which attaches to the top surface of the side wall of the truck box. The side rail is connected to the respective panel by a hinge 14. Each panel has a rail 15 which is pivotally mounted at one end 16 to the respective panel. Thus the rail 15 of the drivers side panel 11 is attached at its end 16 adjacent the rear of the panel. Thus the rail 15 of the passenger side panel 12 is attached at its end 16 adjacent the forward end of the panel. Each rail has its opposite end, in a retracted position of the rail, latched as indicated at 17 to the underside of the panel. Each panel can be moved from a closed position lying across the top of the truck box where the inner side edges 18 of the panels are slightly overlapping. In the raised position of the panels obtained by pivoting the panels about the hinge 14, the panels stand generally upwardly from the respective side wall of the truck box and the rails 15 are moved to an extended position pivotal about the end 16 so that the end 17 is moved into engagement with the opposite panel at a receptacle 19. Thus in the raised position of the panels each rail extends across between the panels with the rail of the passenger side panel 12 at the front and the rail of the driver side panel 11 at the rear. Each of the panels includes a bracket 20 for receiving one end of an air cylinder (not shown) which extends from the bracket 20 to a corresponding bracket attached to the front wall of the truck box as described hereinafter.

The panel 11 also includes a locking system generally indicated at 21 in the form of a handle 22 which operates a rod 23 for actuating locking elements 24 at spaced positions along the panel. Locking elements engage with cooperating members on the opposite panel.

Figure 4:
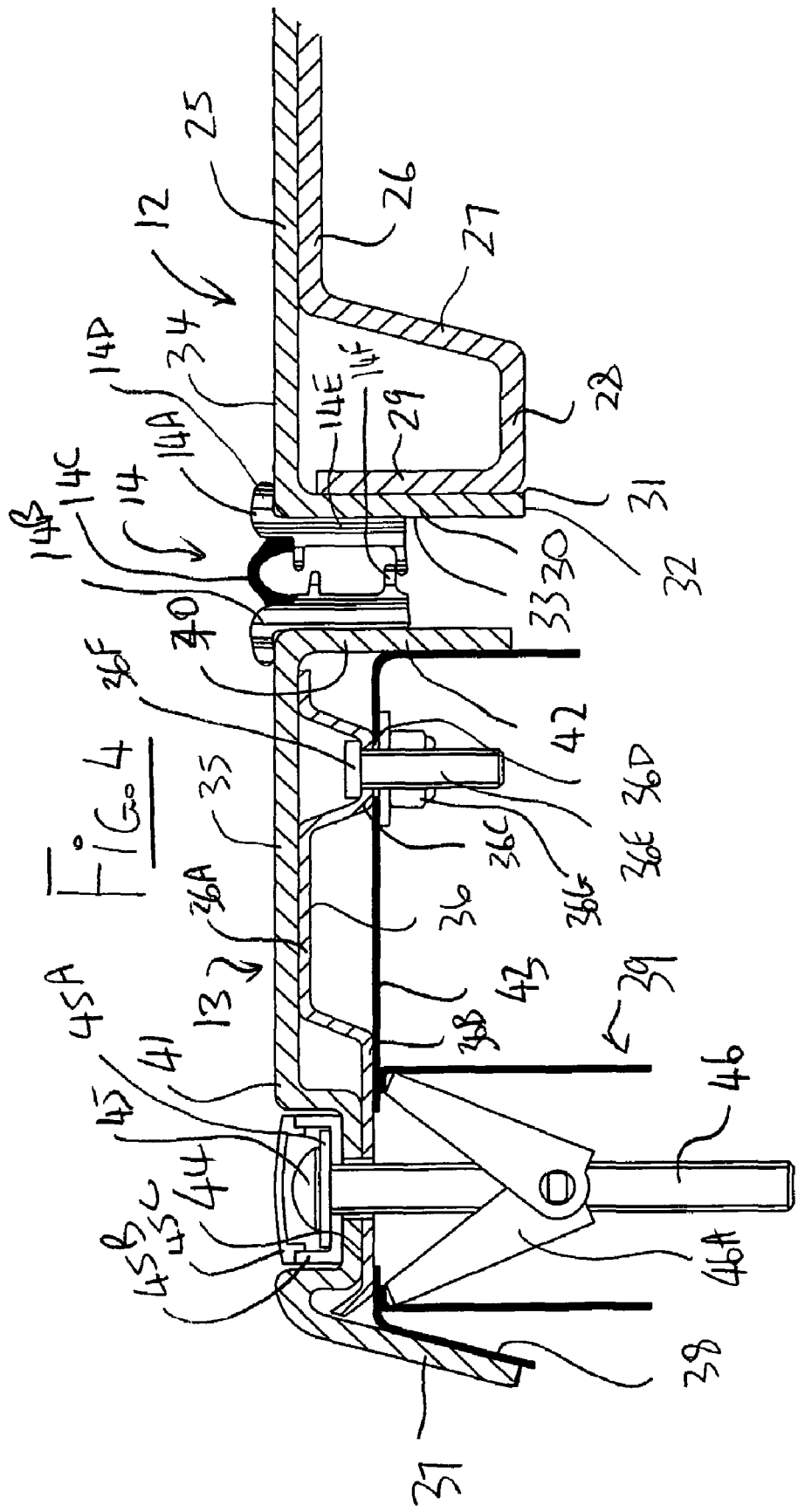
FIG. 4 is a cross sectional view along the lines 4-4 of FIG. 2.

Turning now to FIG. 4, there is shown in more detail the arrangement of the outside portion of the panel 12 including the rail 13 and the hinge 14. The panels 11 and 12 as shown in the cross section of FIG. 4 are formed from a top or outer sheet 25 and an inner or bottom sheet 26. Each of these sheets is moulded or vacuum formed from an ABS plastics material. The sheets are shaped to a required arrangement and then adhesively fastened together to provide the necessary structural strength. At the outer edge of the panel at the hinge 14, the inner sheet 26 is bent downwardly to form a depending channel portion 27 with a bottom wall 28 and an upstanding outermost wall or lip 29. In order to cooperate with this, the outer sheet 25 has a depending lip 30. An outer surface of the lip 29 is adhesively attached to an inner surface of the lip 30 at a junction line 31. The height of the two lips is such that the lip 29 is contained underneath the bottom surface of the outer sheet 25. The bottom edge 32 of the lip 30 terminates at a position coterminous with the bottom wall 28. The lip 30 thus forms a wall surface with an outer surface 33 which is generally at right angles to the horizontal top surface 34 of the outer sheet 25.

The rail 13 is also formed from an outer sheet 35 and an inner sheet 36. The outer sheet 35 is shaped to form an outer depending wall 37 which extends downwardly and outwardly to form a flange covering an outer flange 38 of the truck box indicated at 39. At an inner edge, the rail 13 includes a depending wall 40. The spacing between the walls 37 and 40 is such that the top portion 41 of the rail covers a top surface 42 of the side wall of the truck box with the depending inside wall 40 along the inside surface 42 of the side wall and the flange 38 being covered by the outside wall portion 37.

At spaced positions along the length of the rail, the outer sheet is shaped to form a circular depression 44 to receive a bolt head 45 of a fastening bolt 46. As shown in FIG. 1 there is a limited number of such depressions 44 and in the embodiment shown there are four such depressions at spaced positions along the length of the rail 13.

The inner sheet 36 is shaped so that a center portion 36A contacts the underside of the sheet 35 and two side portions 36B and 36C depend downwardly to form channels with a bottom surface arranged to sit on the top surface 43 of the truck box side wall. These two channels of the inner sheet 36 thus support the center portion 41 of the outer sheet at a position spaced upwardly from the surface 43 of the side wall.

Within the channel 36C is provided a series of holes 36D at spaced positions along the length thereof each having a captive bolt 36E contained therein for engaging through a hole in the top surface 43.

Thus there is provided a row of the bolts 36E which are arranged adjacent the inside surface 42 of the side wall of the truck box. Thus there is a second row of bolts 46 adjacent the outer flange 38. The arrangement of the bolts 46 and the captive bolts 36E is such that they match the design of the truck box of a particular manufacturer. The bolt fasteners 46 are arranged to co-operate with four stake holes of the truck box. The bolts 36E are arranged in a row at spacing to co-operate with a row of attachment holes for the truck box side walls.

These fastening arrangements are designed for example with a truck such as a Ford F150 to match the fastening holes already in place in the truck box side wall where those fastening holes are conventionally used to fasten a top rail over the truck box side wall supplied by the manufacturer Ford. When it is intended therefore to apply the tonneau cover of the present arrangement, therefore, the side rail which is already in place is removed exposing the holes in the top rail of the side wall which are then used without additional drilling or any other modification to fasten the rail 13 to the side wall.

The fastening is effected by utilizing the bolt fasteners 46 which are of the butterfly-type and include spreading wings 46A which pass through the hole in the side wall and then are spread by further tightening of the bolt 46 by actuation on the head 45 so as to pull the wings 46A back up underneath the opening in the side wall to pull the head 45 down onto the side walls to clamp the rail in place. The head 45 includes a washer 45A and an enclosing cap 45B which engages around the head and includes a cover 45C. It will be appreciated that the head 45 is accessible from the exterior of the truck box so that the first fastening can be effected by actuation of the bolt 46 to hold the bolts in place. The bolts 36E simply pass through holes in the truck box side wall so that the end of the bolt is accessible from the inside of the truck box. The heads 36F of the bolts 36E are contained between the outer sheet 35 and the inner sheet 36 so as to be inaccessible from the exterior of the truck box. The installer can then apply a nut 36G onto the bolt 36E from the inside of the truck box.

When installed, therefore, it will be appreciated that the bolts 36E are inaccessible from the exterior of the truck box so they cannot be removed from the exterior. When the cover is therefore closed and locked, the bolts are completely inaccessible thus preventing an unauthorized person from unbolting the cover and removing it from the truck box.

The two rows of fasteners provide a stable attachment of the rail to the truck box side wall since one wall is adjacent the inside and the other row is adjacent the outside thus preventing tilting of the rail on the side wall when forces are applied from the pivotal movement of the panel at the hinge 14.

The butterfly fasteners can be replaced by clips which are attached to the panel and simply pop into the hole in the side wall without the necessity for screw fastening, bearing in mind that the main fastening is effected by the bolts 36E. This allows the installation to be simplified by pop fastening the rail onto the side wall so that it is held in place by the pop or snap fasteners and then can be fastened more vigorously by the bolts 36E. The use of the pop fasteners also overcomes the difficulty that the area where these fasteners are located is inaccessible from the exterior or interior of the truck box.

The hinge 14 comprises an inner piece 14A which is attached to the surface 33 of the lip 30 and an outer piece 14B which is attached to the depending wall 40 of the rail 13. The hinge 14 is generally symmetrical and includes the inner piece 14A and the outer piece outer piece 14B together with a flexible interconnecting bridging member 14C. The inner piece, the outer piece and the bridging piece are all continuous along the full length of the hinge and the hinge is continuous along the full length of the rail and the panel. The inner and outer piece each include a top lip portion 14D and a depending flange portion 14E which are adhesively attached to the respective end lip.

The bridging piece 14C is molded from a different plastics material so that it provides flexibility whereas the inner and outer pieces are formed of a material which is more rigid to provide effective attachment of those inner and outer pieces to the respective lip. The bridging piece 14C is sufficiently flexible so that it can bend through 90° allowing the panel to move from the horizontal position shown in FIG. 4 to a raised vertical position (not shown) standing vertically upwardly at right angles to the position as shown.

The hinge thus provides a continuous closure between the panel and the rail so that there is no possibility for the penetration of the moisture therebetween. There is continuous attachment of each of the inner and outer pieces of the hinge to the respective portion of the rail and the panel and the bridging piece 14C is continuous.

The facing surfaces of the inner piece 14A and the outer piece 14B include co-operating flange members 14F. Thus the outer surface of the inner piece 14A has a pair of flanges projecting outwardly and the inner surface of the outer piece 14B includes a pair of flanges projecting inwardly. The flanges on the piece 14A are spaced slightly further apart than the flanges on the piece 14B so that when the panel is in the closed position as shown in FIG. 4 the flanges prevent upward and downward flexing movement of the hinge which would allow the outer edge of the panel to move upwardly and downwardly relative the rail. Thus if the panel moves upwardly, the flanges at the bottom abut and if the panel moves downwardly the panels at the top abut.

Figure 5:
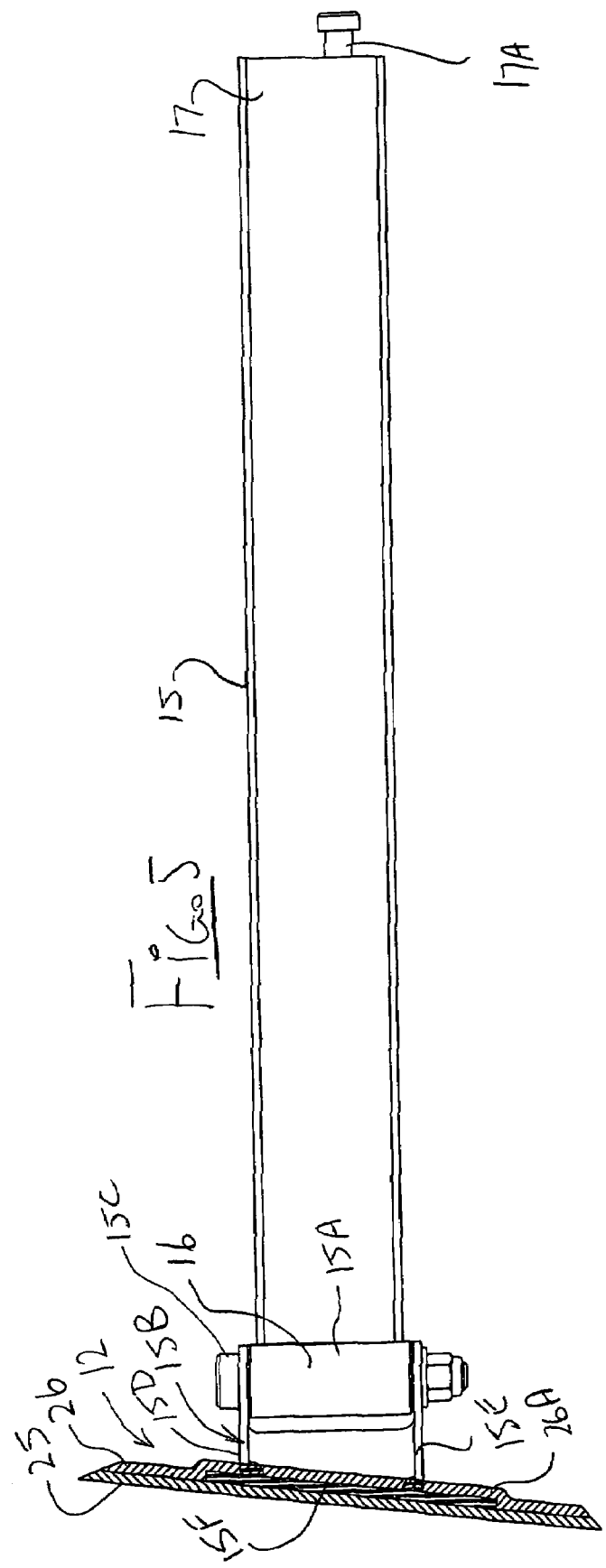
FIG. 5 is a cross sectional view along the lines 5-5 of FIG. 2 showing the rail in the extended position.

Turning now to FIG. 5, there is shown more detail of the end 16 of the rail 15. Thus a portion of the panel is indicated at 12 and includes the outer sheet 25 and the inner sheet 26. The rail 15 carries a sleeve 15A at the end 16 which attaches to a bracket 15B by a bearing 15C. The bracket 15B includes a pair of legs 15D and 15E which are welded to a best plate 15F. The base plate 15F is mounted between the two sheets 25 and 26 so that it is received in a slightly recessed portion 26A of the sheet 26 leaving the outside surface of the outer sheet 25 smooth. This provides therefore an effective technique for rigidly mounting the bracket 15B and the bearing 15C to the panel on the underside of the panel. The rail 15 is shown in FIG. 5 in the extended position projecting outwardly from the pane 12. It will be noted however that the rail 15 is not at right angles to the panel 12 but instead the panel 12 is inclined upwardly and slightly inwardly when the rail 15 is horizontal as shown. In this way it will be appreciated that the panels in their erected position when the rails are erected are inclined upwardly and inwardly from the hinge 14 to the top edge which is spaced therefore slightly inwardly from the side wall of the truck box.

Figure 7:
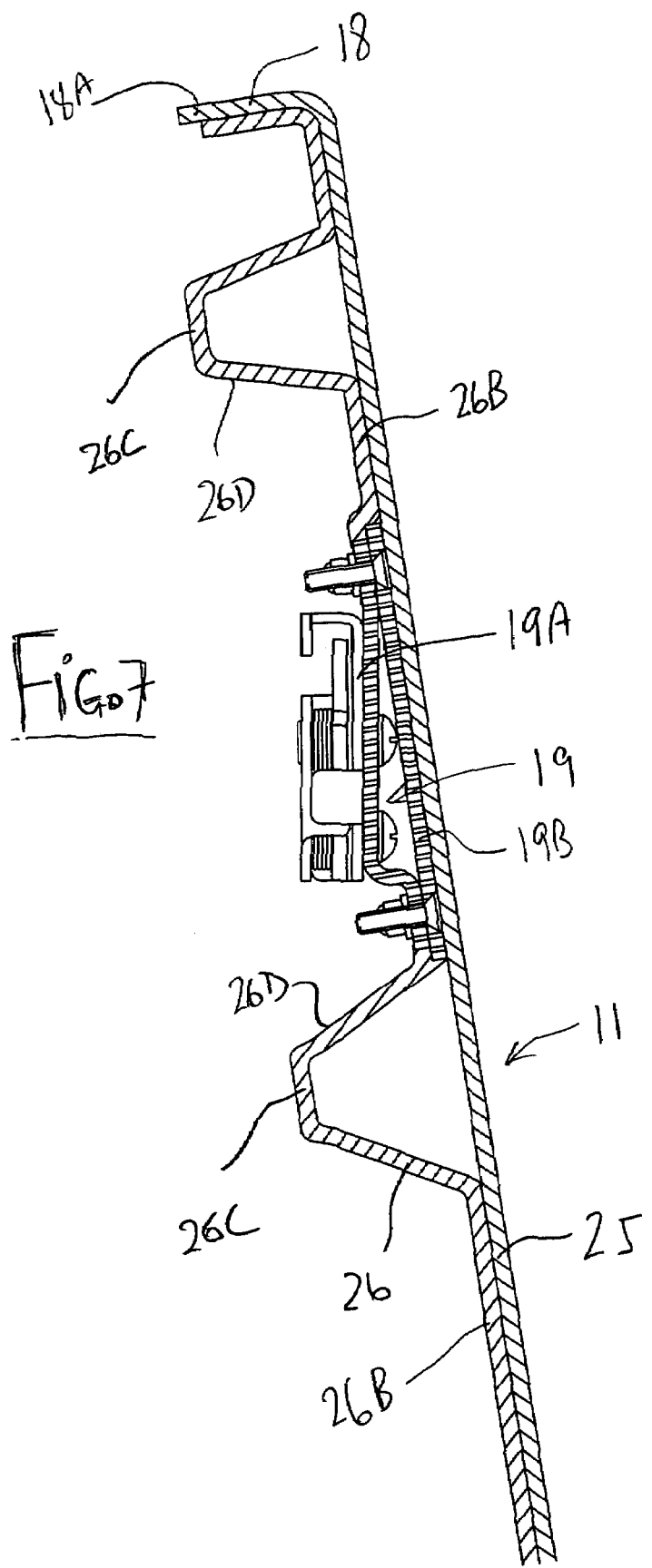
FIG. 7 is a cross sectional view along the lines 7-7 of FIG. 2.

Turning now to FIG. 7, there is shown the receptacle 19 on the opposite panel 11 for attachment to the opposite end 17 of the rail 15 of FIG. 5. At the end 17 is mounted a pin 17A and this is arranged for co-operation with a gate latch 19A on the opposite panel 11. The opposite panel 11 is also formed from the outer sheet 25 and the inner sheet 26. These are shaped similarly to the corresponding sheets of the panel 12 but it will be appreciated that there are slight differences in view of the position and location of the rail and the latch 19A.

In FIG. 7 it will be noted that sheet 25 is also smooth and extends continuous out to the edge 18 of the panel. At the edge 18 of the panel 11 is provided a lip 18A which extends generally at right angles to the main body of the panel as defined by the outer surface 25. The inner sheet 26 includes portions 26B which are attached directly to the inside surface of the outer sheet 25 and recessed portions 26C which form ribs 26D which are spaced from the inside surface of the outer sheet 25 and thus provide structural ribs providing increased strength. Between the two ribs 26D is provided the receptacle 19 for the latch 19A. Embedded between the sheets 25 and 26 is provided a base-plate 19B which is fastened to the inside surface of the outer sheet 25 and provides a support for the gate latch 19A. It will be noted again that with the gate latch 19A arranged at right angles to the length of the rail 15 for engagement onto the pin 17A, there is an angle between the gate latch 19A and the panel which is symmetrical to the angle between the end 16 of the rail and the panel 12 so that symmetrically the panels 11 and 12 are inclined upwardly and inwardly with the rail 15 horizontal.

Figure 6:
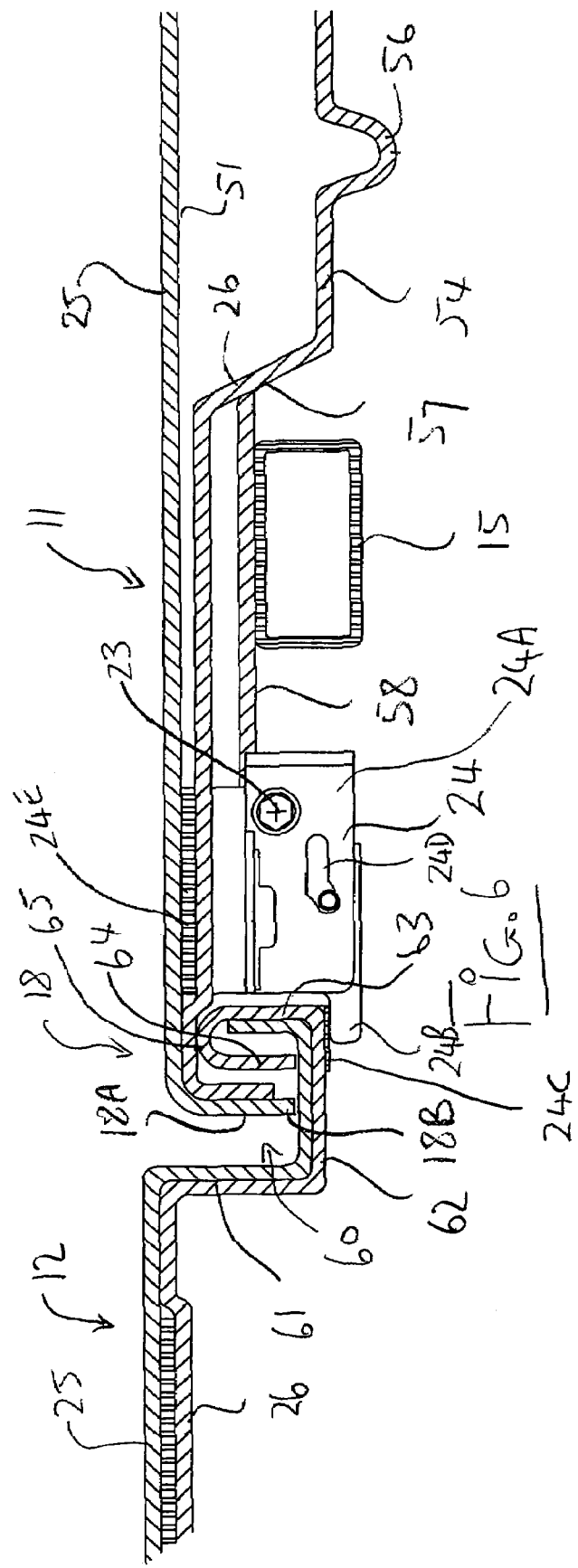
FIG. 6 is a cross sectional view along the lines 6-6 of FIG. 2.
Figure 8:
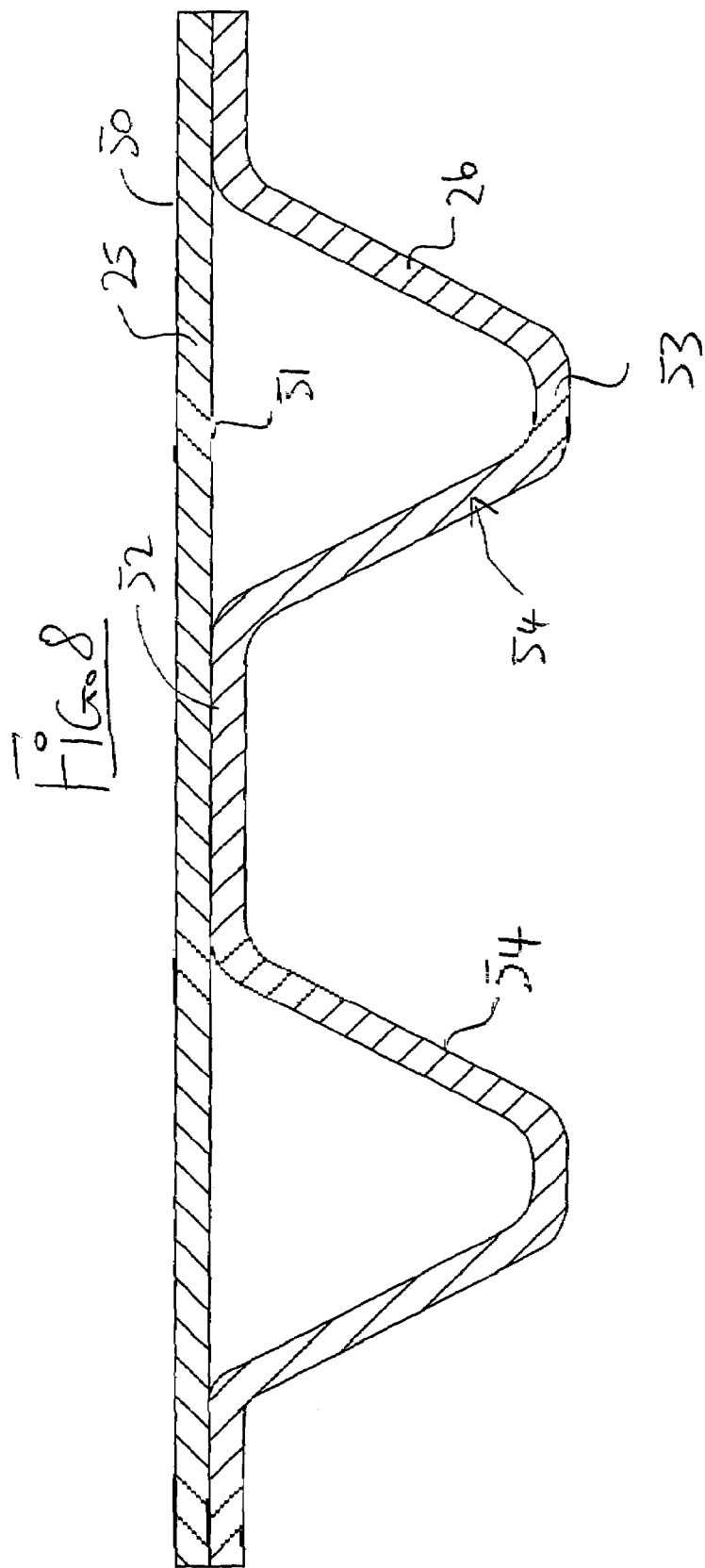
FIG. 8 is a cross sectional view along the lines 8-8 of FIG. 2.

Turning now to FIGS. 6 and 8, the structure of each of the panels is shown in more detail. Thus each of the panels includes the outer layer 25 and the inner sheet 26. As shown in FIG. 8 the outer sheet 25 has a smooth outer surface 50 and the inner sheet 26 is bonded to an inner surface 51 of the outer sheet at portions 52. In between those two bonded sections recessed portions 53 which define a series of ribs 54 across the width of the panel. As shown in FIG. 1 the ribs 54 extend from a position closely adjacent the hinge 14 at the outer edge inwardly through to the inner edge 18. There is in addition a transverse rib 56 at a position spaced just outwardly of the rails 15. Also at the rails the ribs 54 are recessed as indicated at 57 to define a recessed surface 58 against which the rails 15 rest in their retracted or stored position. In this position the rails are retracted below the rib 56. The rib 56 acts as a stiffening member in the longitudinal direction of the panel.

As best shown in FIG. 6 at the edges 18 of the panels, the panel 11 includes the down-turned lip 18A which terminates at an edge 18B. The inner sheet 26 is bonded to the inner surface of the sheet 25 at the inner surface 51 and also into the inner surface of the lip 18A. Thus the lip is defined by the thickness of both the inner and outer sheets to provide strengthening effect to that lip.

The panel 12 is similarly formed from the outer sheet 25 and the inner sheet 26 and these sheets are molded to form a channel 60 into which the lip 18A project. The channel 60 thus includes a depending wall 61, a horizontal bottom wall 62 and an upstanding wall 63. The upstanding wall 63 together with the bottom wall 62 and the depending wall 61 are all formed both from the inner and outer sheets to provide structural strength for the channel 60. The outer sheet at the top of the outer wall 63 extends beyond the inner sheet to form a depending leg 64 and a smooth curved upper surface 65 which provides an attractive appearance to the edge of the channel 60. In the closed position shown in FIG. 6 the lip 18A projects over the smooth upper surface 65 along side the depending leg 64. The underside of the sheet 26 sits on the smooth surface 65 to provide a closure between the panels. The lip 18A projects downwardly into the channel so as to provide in effect a labyrinth seal to prevent moisture from penetrating between the panels. Any moisture entering the channel 60 collects within the channel and is preventing from engaging over the upstanding wall 63 of the channel into the area between the panels. The channel has a discharge at the rear end over the tailgate so that any moisture collecting therein can run along the vehicle to the tailgate for discharge over the tailgate to prevent it entering into the truck box between the panels.

The panels are locked together by a plurality of toggle locks 24 as previously described. The toggle locks 24 comprise a body 24A and a toggle locking member 24B which moves into engagement with a plate 24C on the underside of the bottom wall 62 of the channel. The toggle locking member 24B moves in a direction controlled by a slot 24D so that slides forwardly and moves downwardly underneath the plate 24C. Movement of the toggle locking member 24B is effected by rotation of the hexagonal shaft 23 which rotates a drive member in the body 24A. Toggle locking members of this type are readily available and the details of operation of the movement of the toggle locking member are thus known to a person skilled in the art. The body 24A is mounted on a plate 24E clamped between the sheets 25 and 26 immediately adjacent the lip 18A.

Figure 13:
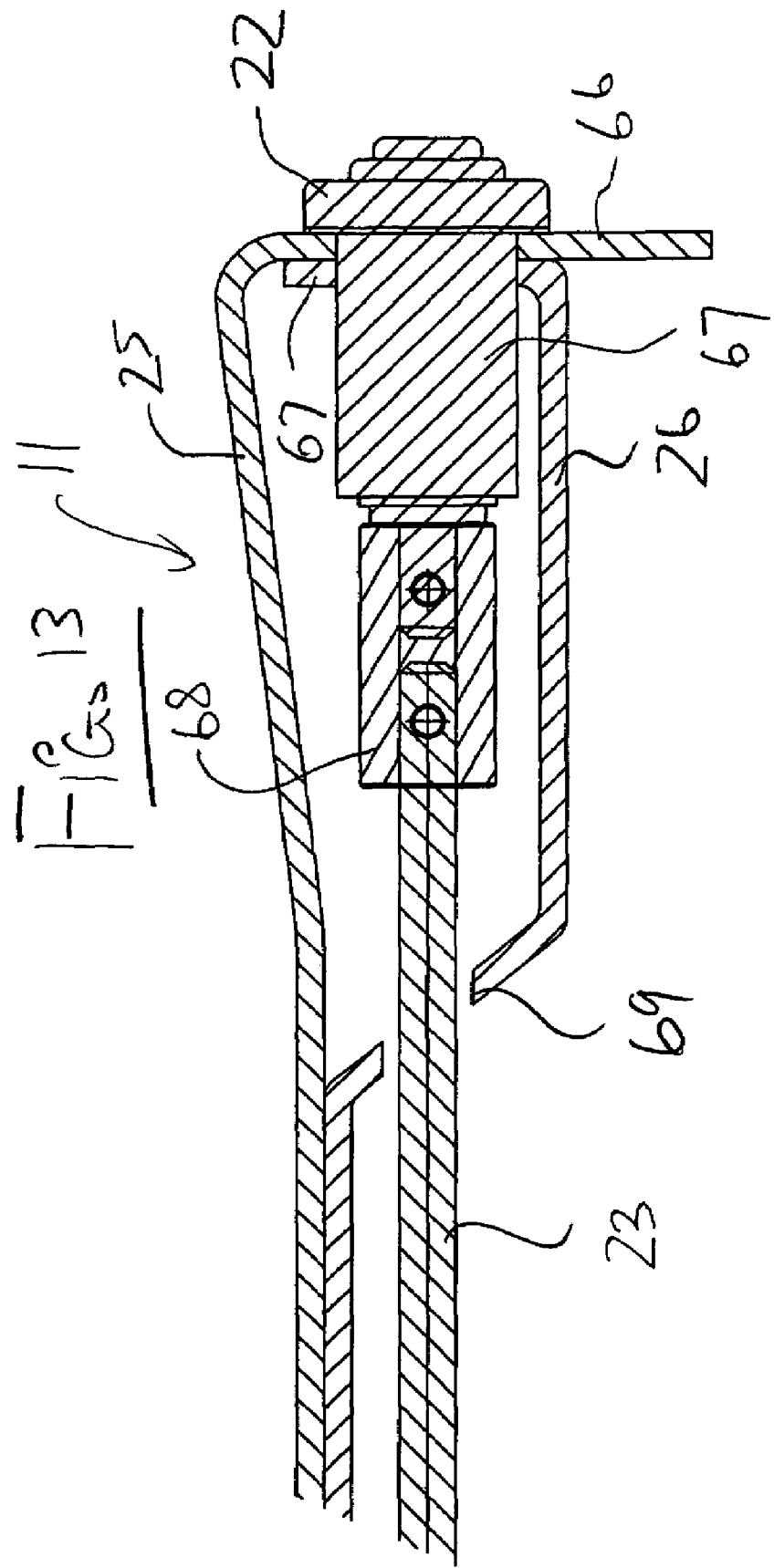
FIG. 13 is a cross sectional view along the lines 13-13 of FIG. 2.

Turning now to FIG. 13 there is shown the mounting of the handle 22 between the outer sheet 25 and the inner sheet 26 in an area between two lips 66 and 67 of those sheets. Thus the handle 22 is presented on the outside of a depending outside lip 66 of the panel 11. The handle 22 attaches to a support and bearing 67 which allows the handle to rotate in the panel. At the end of the support 67 is provided a coupling 68 which attaches to the shaft 23. The shaft 23 emerges through a hole 69 in a sheet 26 so that it extends underneath the panel to the toggle locking member 24.

Figure 9:
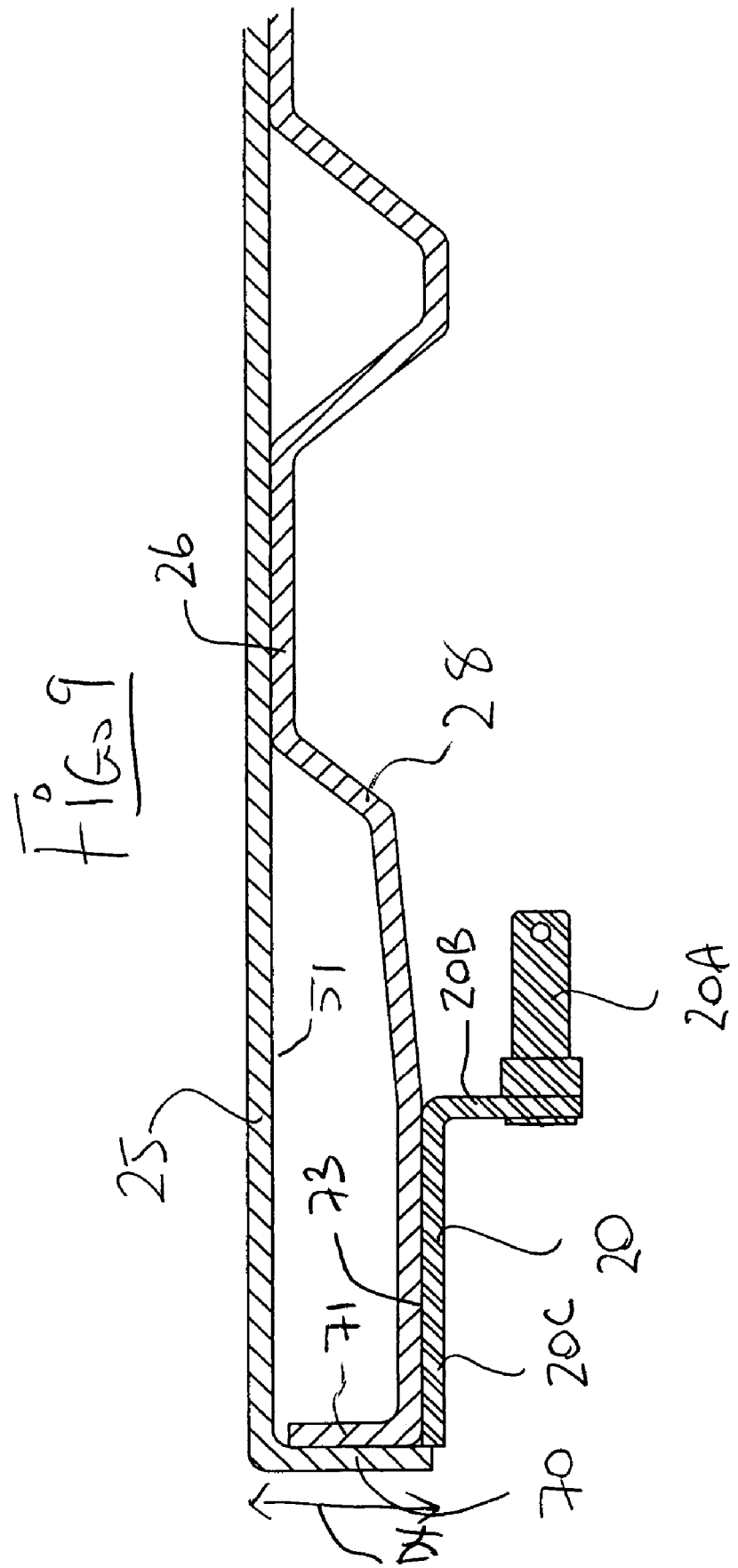
FIG. 9 is a cross sectional view along the lines 9-9 of FIG. 2.
Figure 10:
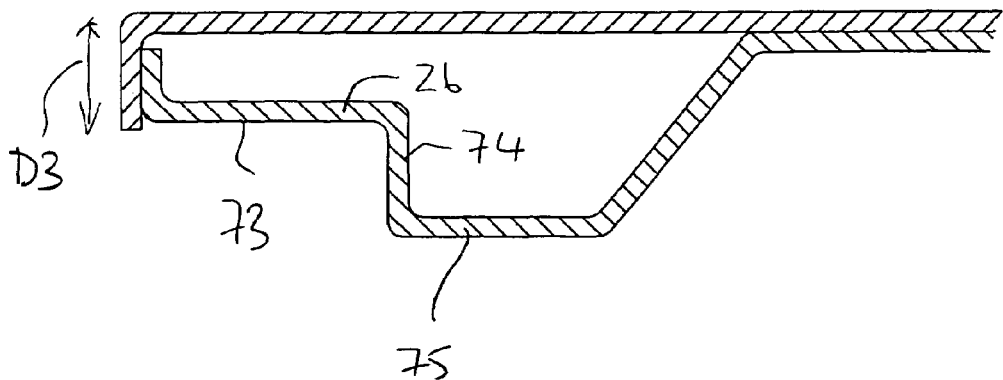
FIG. 10 is a cross sectional view along the lines 10-10 of FIG. 2.
Figure 11:
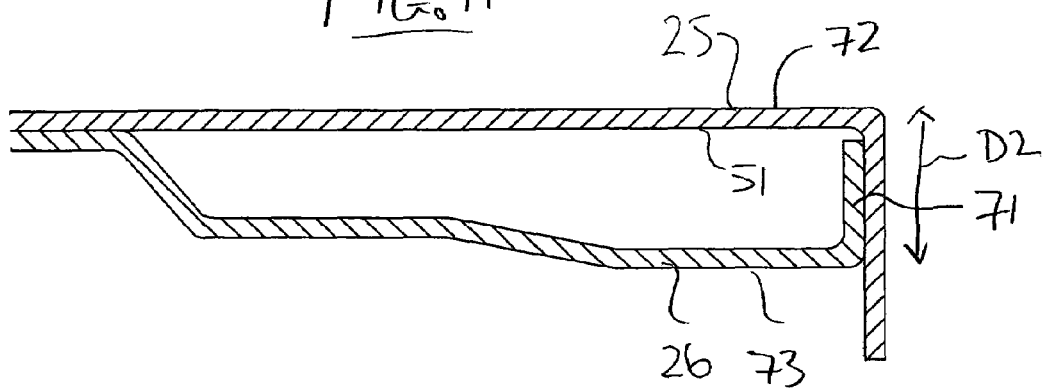
FIG. 11 is a cross sectional view along the lines 11-11 of FIG. 2.
Figure 12:
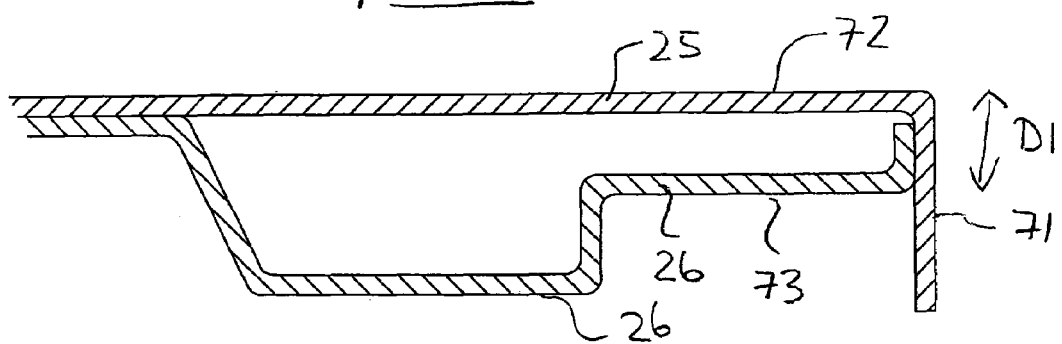
FIG. 12 is a cross sectional view along the lines 12-12 of FIG. 2.

Turning now to FIGS. 9, 10, 11 and 12, there is shown the co-operation of the sheets 25 and 26 at the position adjacent the front and rear sides of the panel. Thus it will be noted in each case the outer sheet 25 at each position where the cross sections are taken includes a depending lip 70. This co-operates with a portion of the sheet 26 which is spaced from the underside 51 of the sheet 25 but includes an upstanding lip 71 which is bonded to the lip 70 and extends upwardly toward the underside 51 of the sheet 25. This arrangement in effect provides a box section along the front edge and along the rear edge of each of the panels to provide structural strength therefore. By comparing the cross sections 11 and 12 at the rear of the panel, it will be noted that the sheet 26 in FIG. 12 which is closer to the side wall of the truck provides a distance D1 between the top surface 72 of the sheet 25 and the bottom surface 73 of the sheet 26 at the lip 71 where the distance D1 is smaller than the distance D2 of FIG. 11. In this way it will be appreciated that the surface 73 of the inner sheet 26 sits on the top edge of the tailgate so that the surface 72 of the outer or top sheet of the panel increases in height relative to the top surface of the tailgate from the outside wall of the truck box towards the center of the truck box. This provides a slight pitch to the panels acting to assist in shedding water to the sides of the truck box. Similarly at the front of the truck box where the cross sections of FIGS. 9 and 10 are taken, the distance D3 is smaller than the distance D4 so that again the panels are supported at a slight pitch angle relative to the front wall of the truck box. Also it will be note din FIG. 10 that the surface 73 of the inner or lower sheet 26 has step 74 which is arranged at a position immediately adjacent the inside surface of the front wall of the truck box to define a further channel portion 75 which extends slightly into the truck box to assist in locating the panels and to increase structural strength adjacent the front edge of the panels.

Figure 2:
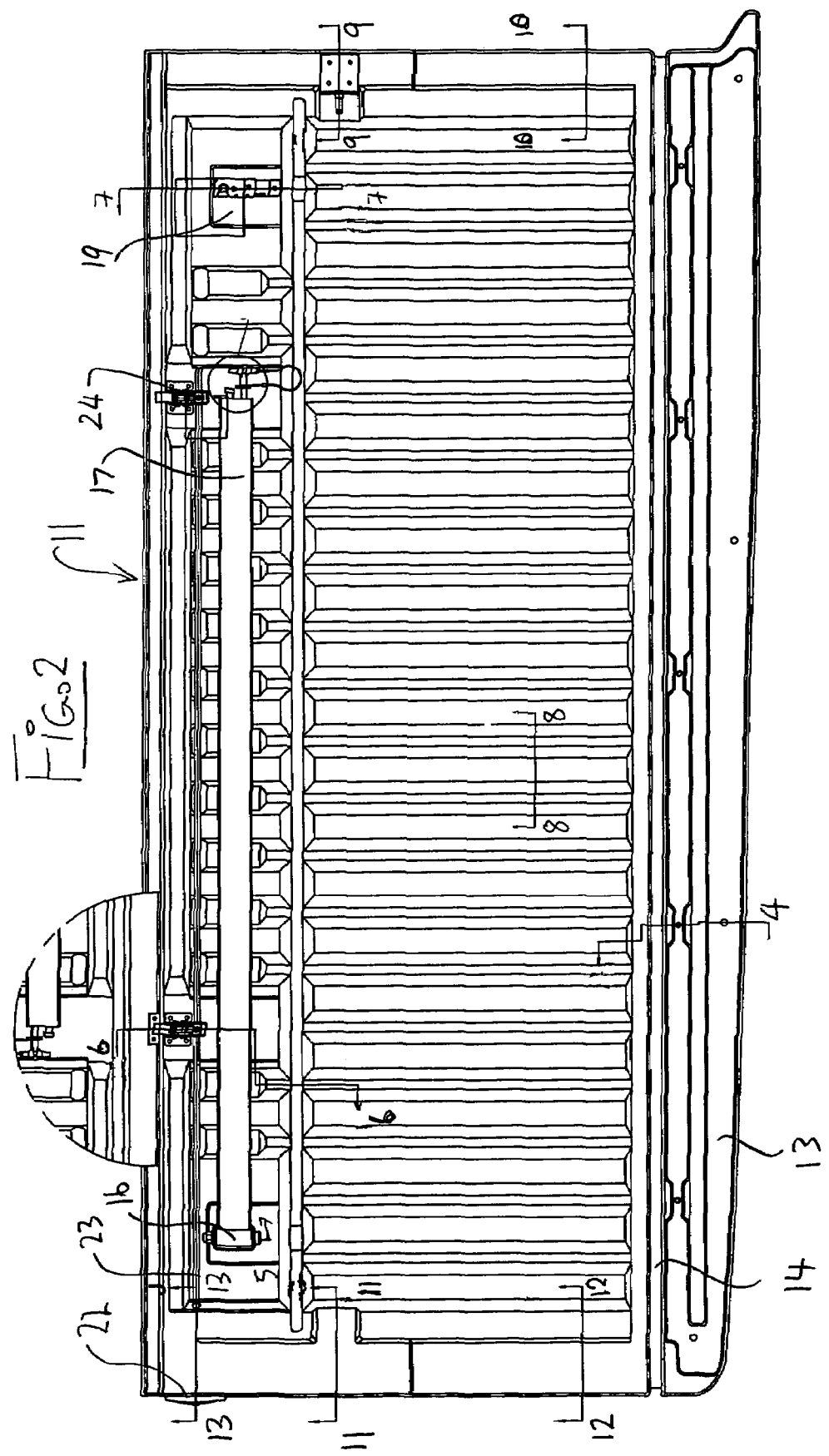
FIG. 2 is a bottom plan view similar to that of FIG. 1 showing the panel on the driver's side that is the left hand side of the truck box on an enlarged scale.
Figure 3:
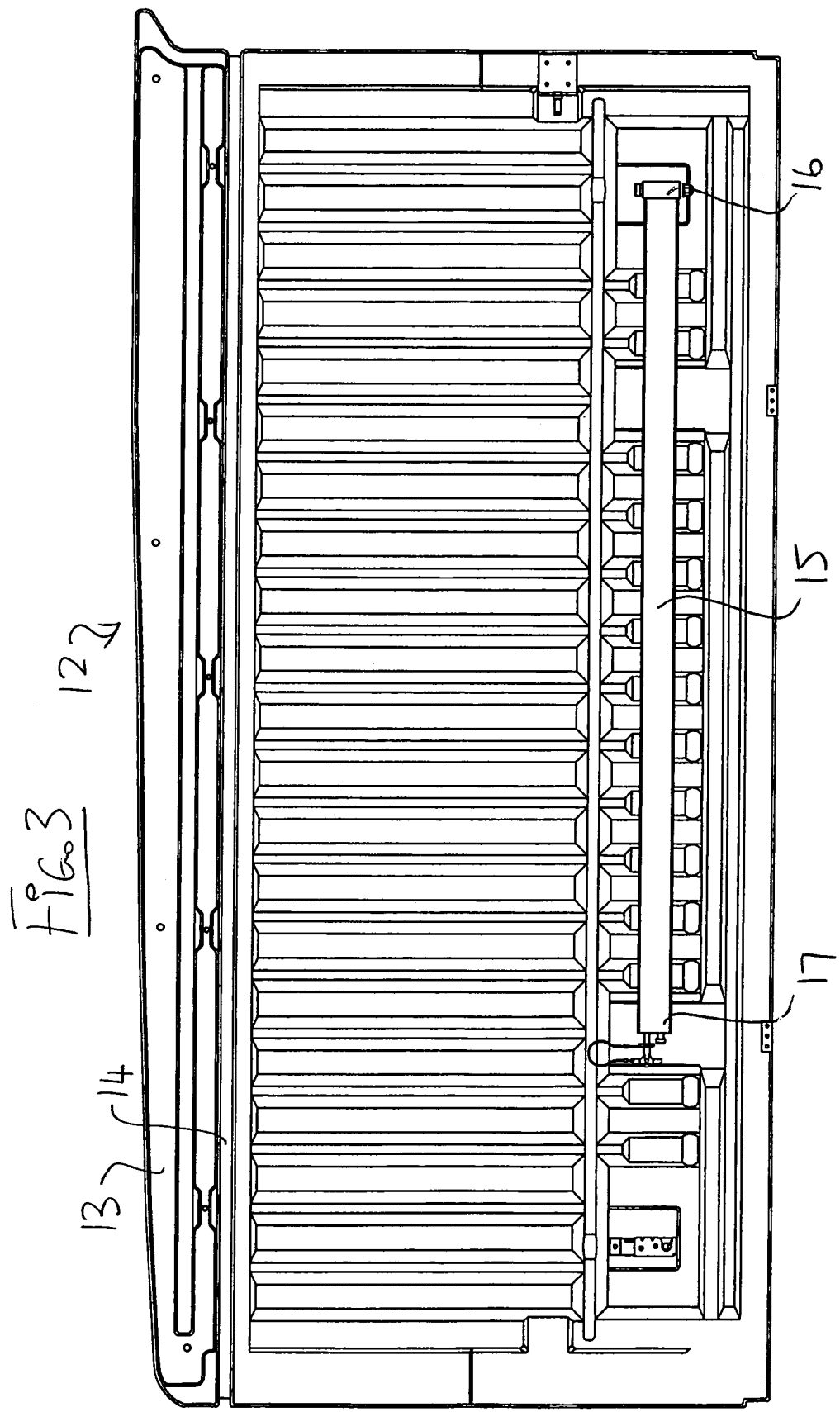
FIG. 3 is a bottom plan view similar to that of FIG. 1 showing only the panel on the passenger side which is the right hand side of the truck box.

While the cross sections of the panel are taken in relation to the panel 11 in FIG. 2, it will be appreciated that the shape of the panel 12 of FIG. 3 is symmetrical in respect to these particular elements and in relation to the shaping of the inner and outer sheets, the only differences being in relation to the locking arrangement and the connection along the center line and in other respects the panels are substantially symmetrical.

Also shown in FIG. 9 is the bracket 20 which attaches one end of the air assist cylinder (not shown). The bracket 20 includes a pin 20A which attaches to a suitable coupling at the end of the cylinder. The pin 20A is mounted on a flange 20B of the bracket 20. The flange 20B is attached to a plate 20C which is screw fastened to the surface 73 of the sheet 26 adjacent the lip 71. The plate 20C is thus flat against the surface 23 and the flange 20B projects outwardly at right angles thereto so as to lie along the inside surface of the front wall of the truck box and supporting the pin 20A so that it projects from the front wall of the truck box longitudinally of the truck box at a position spaced inwardly from the side wall. The pin 20A thus supports the end of the cylinder which is attached to the panel so that the cylinder can apply force to the panel as it opens and closes.

Turning now to FIGS. 16 and 17, there is shown a bracket 80 for supporting a pin 81 from the wall of the truck box for receiving the other end of the cylinder attached to the pin 28A. The bracket 80 includes a first bracket portion 82 which is attached on the outside of the front wall 83 of the truck box. The bracket further includes a plate portion 84 which clamps to the first portion 82 and supports the pin 81 inside the truck box at a position below the top edge of the truck box at the front wall of the truck box.

Thus the truck box includes the upstanding front wall 83 together with an outwardly or forwardly extending top flange 85 and a deep ending flange 86 from the front of the top portion 85. The first bracket portion 82 is shaped to define a slot 87 which matches the flange 86 so that the slot can slide onto the flange 86 so that the leg 88 defining a rear side of the slot slides upwardly until it butt underneath the top plate 85 of the front wall of the truck box. A further leg 89 extends rearwardly from the slot into engagement with a front surface of the wall 83 of the truck box. This leg 89 together with the slot locate the first bracket portion 82 on the outside of the truck box wall at the front and present a receptacle 90 in front of the flange 86 for clamping to the plate portion 84.

The plate portion 84 includes a vertical plate 91 and a horizontal plate 92 which connect together at a corner which engages over the top edge of the wall 83 onto the top plate 85 of the truck box. The horizontal plate 92 is clamped to the receptacle 90 by a threaded fastener 94. This arrangement provides a simple mounting of the bracket to the front wall of the truck box without the necessity for drilling the truck box or forming other shapes or changes in the truck box itself. (It simply can be clamped onto the front wall of the truck box by sliding the slot portion or first portion underneath the flange 86 and then by screwing the plate 92 down onto the receptacle 90 to hang the plate 91 downwardly on the inside of the truck box to present the pin 81 rearwardly of the truck box for engaging the end of the air cylinder.

Figure 14:
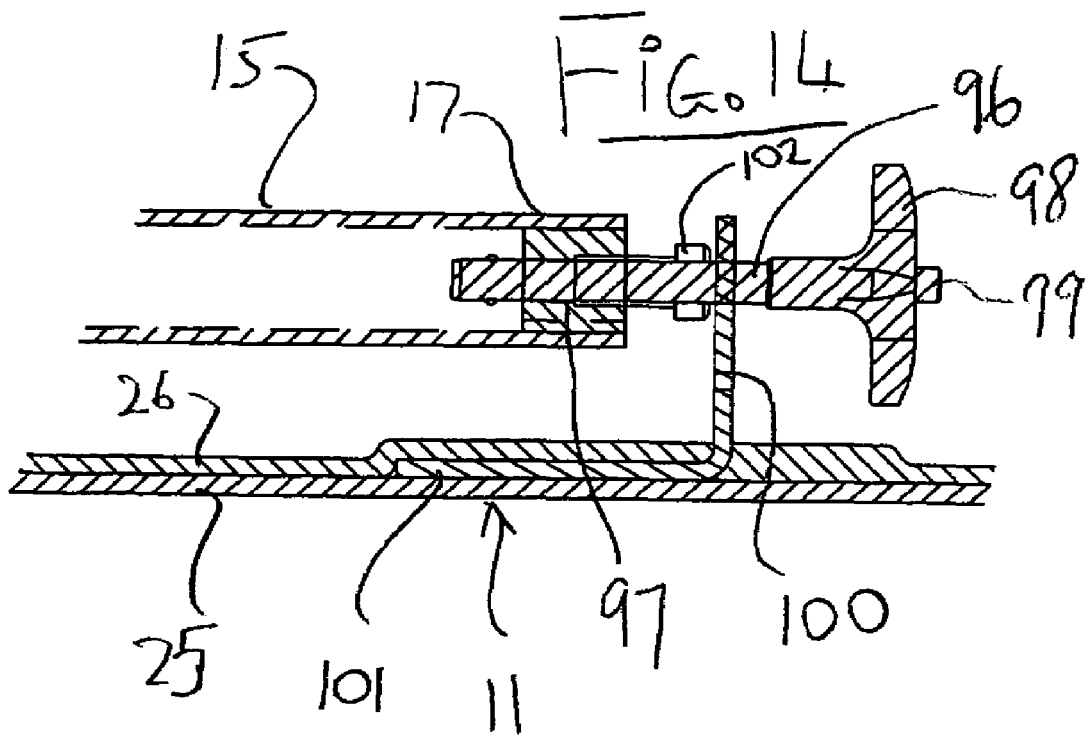
FIG. 14 is a cross sectional view of a first arrangement for locking the end of the rail to the panel when in the retracted position.
Figure 15:
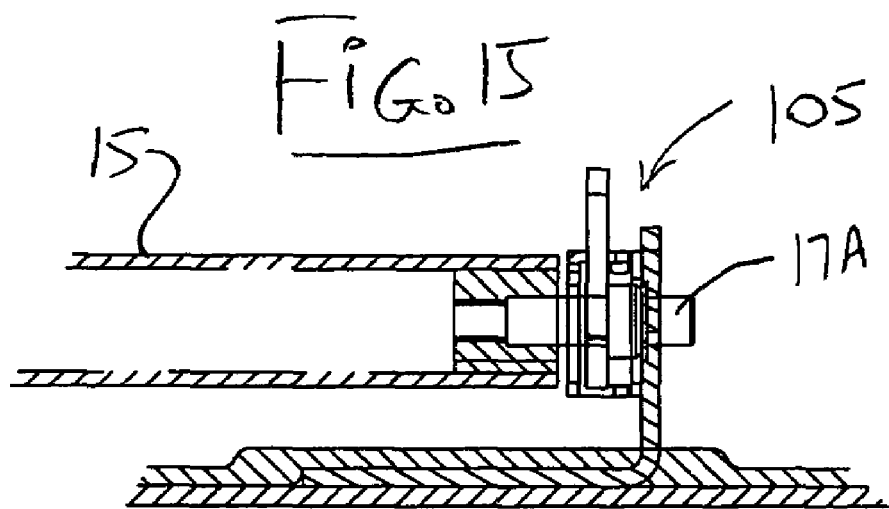
FIG. 15 is a cross sectional view at the same location as that of FIG. 14 showing an alternative arrangement for locking the end of the rail.

Turning now to FIGS. 14 and 15 there are shown two different techniques for mounting the end of the rail 15 at the receptacle for the end 17 on the underside of the panel. In the arrangement shown in FIG. 14, the attachment of the end 17 to the panel 11 is provided by way of a spring pin 96 which projects into a hole 97 in the end of the rail 15. The spring pin 96 includes a handle 98 and an operating button 99 which allows the spring pin 96 to slide through a bracket 100 attached to the panel 11. The bracket 100 includes a base plate 101 clamped between the outer wall 25 and the inner wall 26. Depression of the button 99 releases the pin 96 by retracting locking elements 102 allowing the pin to be withdrawn from the end of the hole in the rail 15. This arrangement of a pin which extends longitudinally along the rail can accommodate significant changes in temperature which occur in certain climates which can differentially expand the panel itself relative to the metal rail thus changing the distance between the bracket 100 and the end of the rail. Such changes in distance are accommodated by a change in the location of the pin 96 within the hole 97 in the end of the rail.

In FIG. 15 is shown an alternative arrangement for use where temperature changes are less dramatic which uses a simple gate latch 105 which receives and traps the pin 17A shown in FIG. 5. The arrangement in FIG. 15 is therefore preferred as a simple latching of the end of the rail 15 when it is moved to the retracted position since it can be simply held in place by engagement into the gate latch and can be readily released when required by the operator pressing on the gate latch. The gate latches can be operated by a suitable linkage pulled from one end.

As best shown in FIG. 2 there are two toggle latches which are operated by the handle 22 and which engage under plates on the panel 12. This number can be increased to provide a more aggressive locking action. In addition the toggle latches can be located closer to the ends so as to hold the ends more effectively attached to the ends of the truck box. In some cases this locking action may be insufficient to provide maximum security since it may still be possible for a user to apply a crowbar between the top edge of the truck box and the underside of the panels. In this case an additional locking element may be provided directly between the panel 11 and a loop fastened to the tailgate. This may be provided by a pin which moves longitudinally of the panel into the loop providing a hole at right angles to the tailgate so that the pin when engaged in the loop prevents the panel from being lifted away from the tailgate.

Figure 18:
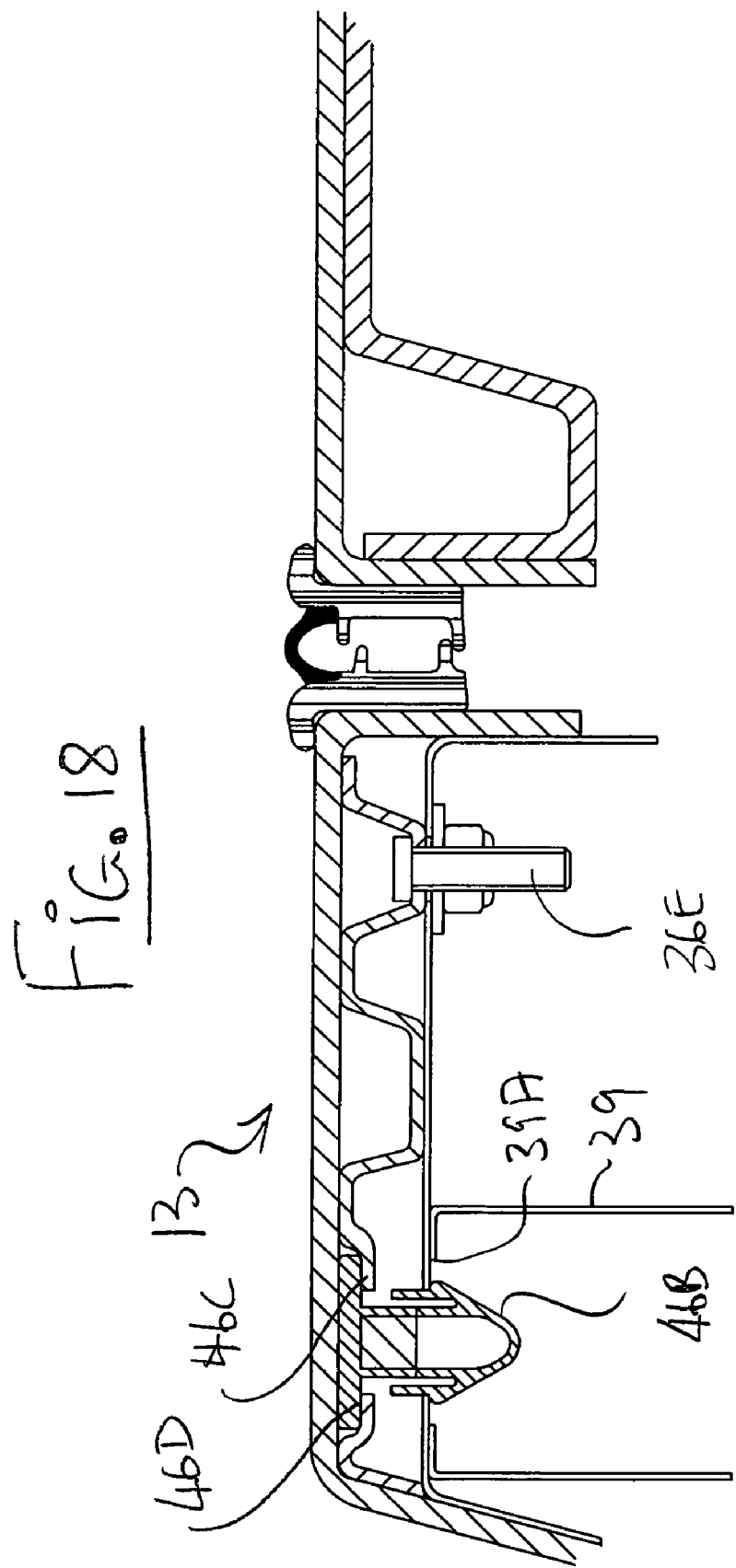
FIG. 18 is a cross sectional view similar to that of FIG. 4 showing an alternative arrangement of the mounting side rail 13.

In FIG. 18 is shown an alternative arrangement of the side rail 13 in which the mounting is simplified by use of a row of spring clip fasteners 46B which snap fasten into holes 39A in the truck rail 39. Thus the rail can be snap fastened in place by the row of spring clips 46B and then clamped down by the second row of fasteners 36 E as previously described. The spring clips are thus attached to the rail from the underside in a slot 46C using a captive head 46D. This avoids forming a hole in the wall of the rail to the top surface, as in the embodiment of FIG. 4, to provide a more attractive appearance and to avoid the fasteners 46 of FIG. 4 being exposed for possible tampering.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. The tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising;
   a pair of mounting rails each arranged to be mounted on a top surface of a respective side wall of the truck box;
   a pair of panels each pivotally mounted on a respective one of the mounting rails for pivotal movement between a closed position and a raised open position;
   each panel in the closed position extending inward from the corresponding mounting rail to a free end such that the free ends of the panels engage each other in the closed position of the panels;
   each panel in the raised open position extending generally upward from the corresponding mounting rail such that the free ends are spaced apart;
   two frame elements each mounted between the panels in the raised open position such that the panels are supported in an upright orientation for containing cargo in the truck box, the frame elements being mounted adjacent respective forward and rearward ends of the panels;
   wherein each mounting rail includes a horizontal portion lying on the top surface of the respective side wall,
   wherein each mounting rail has a row of fasteners adjacent an inner edge for engagement into a corresponding row of first holes in the side wall;
   wherein each mounting rail has a second row of fasteners, spaced outwardly of the first row, for engagement into a corresponding row of second holes in the side wall;
   wherein the fasteners of the first row are fastened from the inside the box;
   wherein the fasteners of the first row include bolts which have a head captured underneath a top surface of the mounting rail so as to be hidden;
   and wherein the fasteners of the second row are fastened from on top of the mounting rail.

2. The tonneau cover according to claim 1 wherein the fasteners of the second row include clips on the underside of the side wall which engage into openings in the side wall.

3. The tonneau cover according to claim 1 wherein the mounting rail includes on inner portion for depending along an inner surface of the respective side wall;
   each panel having an outer down-turned lip arranged adjacent the inner portion of the respective mounting rail;
   each mounting rail including a hinge arranged between the outer edge of a respective panel and the inner portion of the respective mounting rail, the hinge comprising two longitudinal connecting members each fastened along a respective one of the outer edge and the inner portion and a continuous flex coupling therebetween such that the hinge acts as a seal between the outer edge and the inner portion.

4. The tonneau cover according to claim 3 wherein the hinge extends continuously along the respective panel.

5. The tonneau cover according to claim 1 wherein each panel is molded from an inner layer and an outer layer each formed from a plastics material with the outer layer having a panel portion and a surrounding depending lip and with the inner layer being bonded inside the outer layer and wherein the inner layer is shaped to define a plurality of ribs which extend in a direction transverse to the truck box.

6. The tonneau cover according to claim 5 wherein the ribs are recessed to receive the frame element when stored in a retracted position extending longitudinally along the respective panel.

7. the tonneau cover according to claim 5 wherein there are provided three recesses in the ribs at positions spaced longitudinally of the panel, where a first recess is arranged to receive an end of the frame element attached to the panel, a second recess is arranged to receive an opposed end of the frame element and a third recess is arranged to receive and end of the frame element of the opposite panel.

8. The tonneau cover according to claim 5 wherein inner layer forms a shelf around the outer edge of the panel with a shelf lip of the inner layer at the outer lip of the outer layer to support the shelf for engaging onto a top surface of the truck box.

9. The tonneau cover according to claim 5 wherein each frame element includes a base plate for mounting the frame element on the respective panel wherein the base plate is trapped between the inner and outer layers.

10. The tonneau cover according to claim 5 wherein the layers are formed from ABS.

11. The tonneau cover according to claim 1 wherein one of the panels has a raised rib along the inner edge for engaging into a recess along the inner edge of the other panel; wherein one of the panels has a plurality of locking toggle members mounted thereon for pivotal movement to engage underneath a bottom edge of the other panel; and wherein the pivotal movement of the toggle members is effected by a longitudinal bar extending along the panel.

12. The tonneau cover according to claim 11 wherein the locking toggle members are mounted on one of the panels which includes a down-turned lip along its edge at the other panel and wherein the other panel includes a channel along its outer edge with the locking toggle members being arranged to engage underneath a bottom wall of the channel.

13. A tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising:
- a pair of mounting rails each arranged to be mounted on a top surface of a respective side wall of the truck box;
- a pair of panels each pivotally mounted on a respective one of the mounting rails for pivotal movement between a closed position and a raised open position;
- each panel in the closed position extending inward from the corresponding mounting rail to a free end such that the free ends of the panels engage each other in the closed position of the panels;
- each panel in the raised open position extending generally upward from the corresponding mounting rail such that the free ends are spaced apart;
- two frame elements each mounted between the panels in the raised open position such that the panels are supported in an upright orientation for containing cargo in the truck box, the frame elements being mounted adjacent respective forward and rearward ends of the panels;
- each mounting rail including a horizontal portion lying on the top surface of the respective side wall,
- wherein the mounting rail includes an inner portion for depending along an inner surface of the respective side wall;
- wherein each panel has an outer down-turned lip arranged adjacent the inner portion of the respective mounting rail;
- wherein each mounting rail includes a hinge arranged between the outer edge of a respective panel and the inner portion of the respective mounting rail, the hinge comprising two longitudinal connecting members each fastened along a respective one of the outer edge and the inner portion and a continuous flex coupling therebetween such that the hinge acts as a seal between the outer edge and the inner portion;
- and wherein each connecting member includes a top lip and a depending wall with the continuous flex coupling forming a flexible potion connected across the connecting members at the top lip.

14. The tonneau cover according to claim 13 wherein each connecting member has a guide flange portion extending therefrom toward the other connecting member.

15. A tonneau cover for a pick up truck having a truck box with a bed, a front and wall and two vertical side walls standing upwardly from the bed, and a rear tail gate pivotal from a raised position extending across the side walls to a horizontal lowered position, the cover for the truck box comprising;
- a pair of mounting rails each arranged to be mounted on atop surface of a respective side wall of the truck box;
- a pair of panels each pivotally mounted on a respective one of the mounting rails for pivotal movement between a closed position and a raised open position;
- each panel in the closed position extending inward from the corresponding mounting rail to a free end such that the free ends of the panels engage each other in the closed position of the panels;
- each panel in the raised open position extending generally upward from the corresponding mounting rail such that the free ends are spaced apart;
- two frame elements each mounted between the panels in the raised open position such that the panels are supported in an upright orientation for containing cargo in the truck box, the frame elements being mounted adjacent respective forward and rearward ends of the panels;
- each mounting rail including a horizontal portion lying on the top surface of the respective side wall,
- wherein each panel is molded from an inner layer and an outer layer each formed from a plastics material with the outer layer having a panel portion and a surrounding depending lip and with the inner layer being bonded inside the outer layer;
- wherein the inner layer is shaped to define a plurality of ribs which extend in a direction transverse to the truck box,
- wherein inner layer forms a shelf around the outer edge of the panel with a shelf lip of the inner layer at the outer lip of the outer layer to support the shelf for engaging onto a top surface of the truck box;
- and wherein the shelf at the front and rear ends of the panel is shaped such that a spacing of the shelf from the outer layer increases toward a center of the truck box such that the resting of the shelf on the edge of the truck box acts to hold the panels raised at the center of the truck box and lowered at the side walls of the truck box.

* * * * *